Dec. 19, 1967
K. B. MAGLEBY
3,359,366
ELECTRONIC PRINTER
Filed March 5, 1964
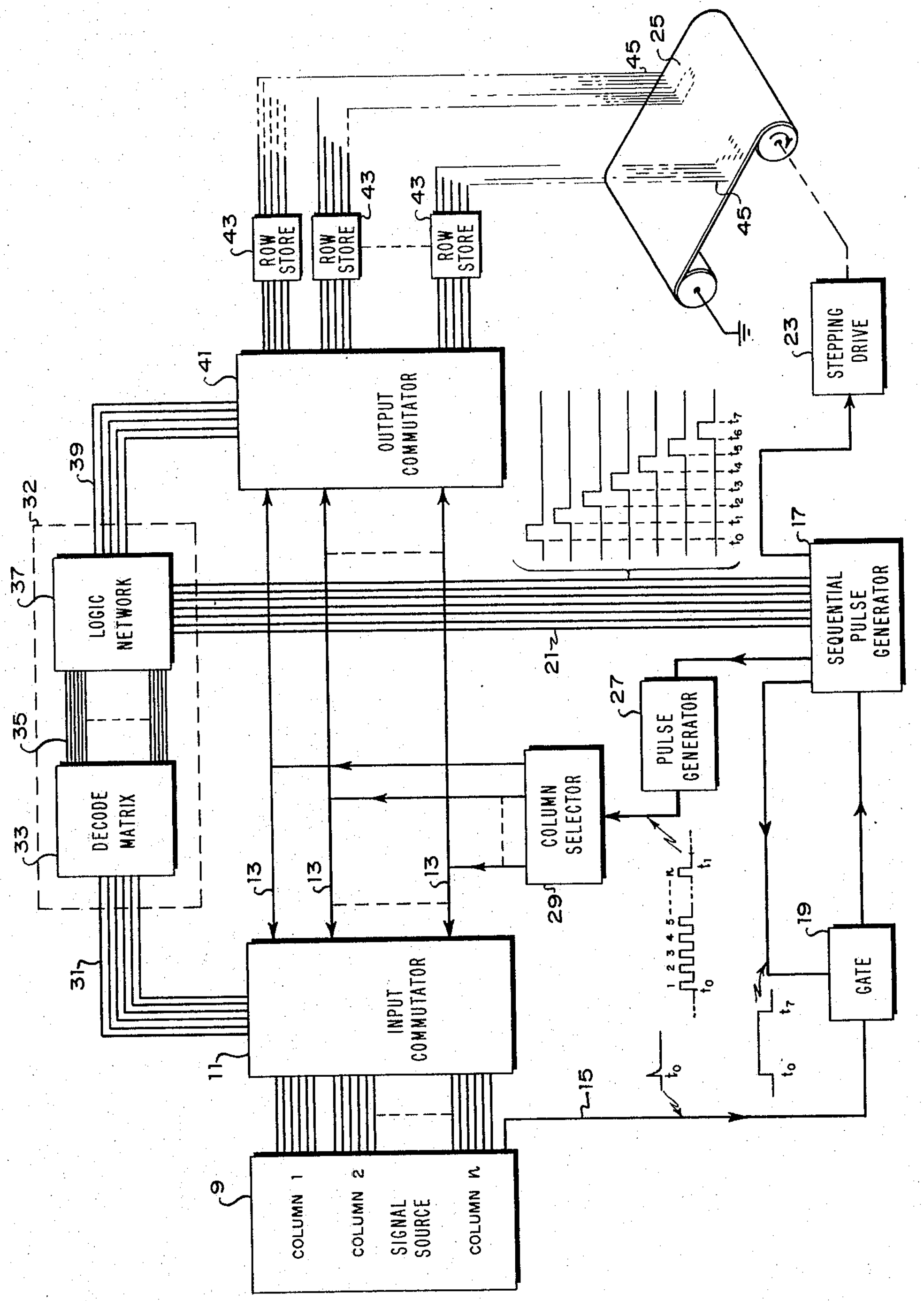
INVENTOR
KAY B. MAGLEBY
BY a. C. Smith
ATTORNEY

United States Patent Office 3,359,366

Patented Dec. 19, 1967

3,359,366
ELECTRONIC PRINTER

Kay B. Magleby, San Jose, Calif., assignor to Hewlett-Packard Company, Palo Alto, Calif., a corporation of California Filed Mar. 5, 1964, Ser. No. 349,670
5 Claims. (Cl. 178—30)

ABSTRACT OF THE DISCLOSURE

An electronic printer uses a single character generator between synchronized input and output commutators to produce selected alphanumeric characters in each of a plurality of columns. Coded alphanumeric input information in a number of channels equal to the number of columns to be printed is scanned sequentially by the input commutator a plural number of times to produce a single line of selected alphanumeric characters simultaneously printed in parallel columns.

It is an object of the present invention to provide an improved electronic printer.

It is another object of the present invention to provide an electronic printer which accepts electronically coded data and produces an instantly visible alphanumeric record of the data in response to an applied print command.

It is still another object of the present invention to provide a multicolumn printer which uses a single logic circuit to produce a plurality of alphanumeric characters on each line of data to be printed in response to an applied print command.

In accordance with the illustrated embodiment of the present invention the input data appearing on a plurality of conductors for each column to be printed is applied to an input commutator which is electronically scanned. The groups of conductors for each of the columns of data are sequentially connected to a decode matrix which produces an output on a selected one of many lines for each alphanumeric character to be printed. A logic network receives the signal on the selected line and produces signals on one or more of five conductors connected to the input of another commutator operating in synchronism with the input commutator. The outputs of this other commutator are groups of five conductors, with a storage element for each group, connected to five print fingers or electrodes provided for each column of data to be printed. The characters in a column are formed as line segments disposed at the intersections of a five vertical line-by seven horizontal line matrix, which five vertical lines are provided by the print fingers as the paper is advanced. The seven horizontal matrix lines common to all the characters in a horizontal row are activated sequentially at a rate related to the rate at which the paper is advanced. Thus the storage elements in each of the groups of five conductors connected to the print fingers are activated to store the signals necessary to produce all the line segments in the first of the seven matrix lines constituting a row of characters. The storage elements are then activated to store the signals necessary to produce all the line segments in the second of the seven matrix lines constituting the same row of data, and so on for all seven matrix lines forming a row of data.

Other and incidental objects of the present invention will be apparent from a reading of this specification and an inspection of the accompanying drawing which shows a block diagram of the printer of the present invention.

Referring to the drawing, a signal source 9 such as an electronic counter produces a coded output on the six lines representing each of the characters to be printed. Each of the $n$ number of groups of six lines is connected to one of the $n$ number of inputs or signal ports of input commutator 11, which inputs or signal ports are sequentially connected as a group, line to line, to the six output lines 31 forming the output signal port of the commutator in response to control pulses sequentially applied to each of the inputs 13 associated with a group of six lines from signal source 9.

The control pulses applied to input commutator 11 are derived in the following manner: Signal source 9 supplies a print command signal on line 15 (say, following the close of the counting time gate) which is applied to the sequential pulse generator 17 through a hold-off gate 19. The sequential pulse generator 17 then performs four simultaneous functions; first, it produces a burst of seven sequential pulses, each appearing on a separate one of the seven lines 21; second, disables the gate 19 to block further application of print commands to generator 17; third, triggers the stepping drive 23 to advance the paper 25 during the burst of seven pulses; and fourth, triggers pulse generator 27 at each of the seven pulses. The pulse generator 27 produces a number of pulses equal to the number ($n$) of columns of data produced by signal source 9. These pulses all appear within the time of each of the seven pulses on lines 21 and are all steered sequentially to the input 13 of commutator 11 by the column selector 29. Thus, the output signal port 31 of commutator 11 containing six lines is connected in sequence within the time of each one of the seven pulses appearing on lines 21 to each one of the $n$ groups of six lines which form the $n$ input signal ports connected to receive the outputs of signal source 9.

Decode matrix 33, including a plurality of diodes in a logic circuit, is connected to receive the coded signals on lines 31 and produce an output on one only of the $2^6$ number of output lines 35 for each of $2^6$ possible alphanumeric characters represented by coded signals on the six lines 31. The one of lines 35 on which a signal appears will vary as the groups of lines from signal source 9 are scanned during the time of each one of the seven pulses on lines 21 (assuming the coded signals on each of the $n$ number of groups of lines are different).

The logic networg 37 is connected to each of the $2^6$ number of lines 35 and to the seven lines 21 for producing signals on selected ones of the five output lines 39 for each one of the $n$ number of output pulses from generator 27. The output commutator 41, operating in synchronism with commutator 11, receives the signals on lines 39 at its input signal port and steers them to the proper row store elements 43 connected to its output signal ports. Thus the character generator 32 including the decode matrix 33 and logic network 37 is used $n$ number of times during each one of the seven pulses on lines 21 to produce the signals which are necessary to produce a set of line segments on paper 25 for each column of characters to be printed as the paper 25 is advanced past print fingers 45. Row store elements 43 are required to store the signals which appear on selected ones of the 5 lines at the outputs of commutator 41 (and which are present sequentially only for the period of one pulse from generator 27) for the period of a pulse on lines 21. Signals will generally be stored on different ones of the five lines connected to print fingers during successive ones of the seven pulses on lines 21. These signals supply current through electrosensitive paper 25 which undergoes a change of composition in response to electrical current to produce a visibly contrasting line segment as the paper is advanced past fingers 45. A single line of data containing $n$ number of characters in the line is thus printed at a time, each character comprising a plurality of line segments positioned in line with the five print fingers in seven possible vertical locations. The stepping drive 23 advances the paper 25 one step per pulse appearing on lines 21 or, in faster machines, one step per selected number of pulses on lines 21. Gate 19 is again rendered conductive following the occurrence of all seven pulses on lines 21.

I claim:

1. An electronic printer comprising:

first means having one signal port and a plurality of other signal ports which connect sequentially to said one signal port;

second means having one signal port and a plurality of other signal ports which connect sequentially to said one signal port in synchronism with the sequential connection of said one signal port of the first means to the plurality of signal ports thereof, each of the signal ports including a plurality of signal conductors;

means including each of the plurality of other signal ports of the first means connected to receive signals applied thereto related to characters to be printed;

a character generator connected between said one signal ports of the first and second means for producing signals on selected ones of the plurality of signal conductors in said one signal port of the second means in response to signals appearing at said one signal port of the first means;

a record chart; and means connected to the plurality of other signal ports of the second means for producing line records on said chart related to signals on said conductors in response to the sequential connection of the plurality of signal ports to the one signal port of one of the first and second means.

2. An electronic printer comprising:

a first commutator having one signal port and a plurality of other signal ports which connect sequentially to said one signal port;

a second commutator having one signal port and a plurality of other signal ports which connect sequentially to said one signal port in synchronism with the sequential connection of the plurality of other signal ports to said one signal port of the first commutator;

each of the signal ports of the second commutator including a plurality of signal conductors;

means including each of the plurality of other signal ports of the first commutator connected to receive signals applied thereto related to characters to be printed;

a character generator connected between said one signal ports of the first and second commutators for producing signals on selected ones of the plurality of signal conductors in said one signal port of the second commutator in response to signals appearing at said one signal port of the first commutator;

electrosensitive recording paper which produces contrasting marks in regions of the surface thereof to which an electrical signal is applied;

means connected to the plurality of other signal ports of the second commutator for applying to said paper at selected locations on the surface thereof electrical signals related to signals on the conductors of each of the plurality of other signal ports of the second commutator; and means to alter the location on the surface of said paper at which electrical signals are applied in response to the sequential connection of the plurality of signal ports of the second commutator to said one signal port thereof.

3. An electronic printer comprising:

first and second commutators each having one signal port and a plurality of other signal ports, each of the signal ports including a plurality of signal conductors;

means actuating the first and second commutators in synchronism to connect said one signal ports sequentially to each of the corresponding plurality of other signal ports;

means including the signal conductors in each of said other signal ports of the first commutator connected to receive electrical signals thereon as coded representations of the characters to be printed;

a first network having output lines and being connected to said one signal port of the first commutator for producing a signal on one of said plurality of output lines for each character to be printed as represented by coded electrical signals appearing on the conductors of said one signal port of the first commutator;

a second network connected to said one signal port of the second commutator for producing electrical signals on selected ones of the conductors in the last-mentioned signal port related to a signal appearing on an output line of the first network;

electrosensitive recording paper which produces contrasting marks in regions of the surface thereof to which an electrical signal is applied;

means connected to the plurality of other signal ports of the second commutator for applying to said paper at selected locations on the surface thereof electrical signals related to signals on the conductors of each of the plurality of other signal ports of the second commutator; and means to alter the location on the surface of said paper at which electrical signals are applied in response to the sequential connection of the plurality of signal ports of the second commutator to said one signal port thereof.

4. An electronic printer comprising:

a first commutating device having a plurality of inputs and an output;

a second commutating device having an input and a plurality of outputs, each of the input and outputs including a plurality of signal conductors;

each of the first and second commutating devices operating in synchronism to connect an input and an output in response to a control pulse applied to an inlet thereof corresponding to an input of the first device and corresponding to an output of the second device;

means connected to the inputs of the first commutating device for applying electrical signals thereto as coded representations of characters to be printed;

a first network having output lines and being connected to the output of the first commutating device for producing a signal on one of the plurality of output lines for each character to be printed as represented by coded electrical signals appearing on an input of the first commutating device;

a second network having a plurality of inlets and being connected to the input of the second commutating device for producing electrical signals on selected ones of the conductors in the last-mentioned input in response to the combination of signals appearing on an output line of the first network and on an inlet of the second network;

a generator connected to the inlets of the second network for producing timing signals thereon and for producing a plurality of control pulses for each timing signal;

means connected to receive said control pulses for applying successive ones thereof simultaneously and sequentially to inlets of the first and second commutating devices;

electrosensitive recording paper which produces contrasting marks in regions of the surface thereof to which an electrical signal is applied;

circuit means connected to the plurality of outputs of the second commutating device for applying to said paper at selected locations on the surface thereof electrical signals related to signals on the conductors of each of the plurality of outputs of the second commutating device; and means connected to said generator for altering the locations on the surface of said paper at which electrical signals are applied in response to said timing signals produced by said generator.

5. An electronic printer as in claim 4 wherein:

said circuit means includes signal storage devices connected to receive the signals on selected ones of the signal conductors in the outputs of the second commutating device during the period of a control pulse for maintaining such signals on said selected conductors for a period related to the period of a timing signal.

References Cited

UNITED STATES PATENTS

| | | | |
|---|---|---|---|
| 2,932,692 | 4/1960 | Hunt | 178—30 |
| 3,085,132 | 4/1963 | Innes | 178—30 |
| 3,225,883 | 12/1965 | Ayres | 197—11 |

THOMAS A. ROBINSON, *Primary Examiner.*